US010013805B2

United States Patent
Barzuza et al.

(10) Patent No.: US 10,013,805 B2
(45) Date of Patent: Jul. 3, 2018

(54) CONTROL OF ENHANCED COMMUNICATION BETWEEN REMOTE PARTICIPANTS USING AUGMENTED AND VIRTUAL REALITY

(71) Applicant: Avaya Inc., Basking Ridge, NJ (US)

(72) Inventors: Tamar Barzuza, Tel Aviv (IL); Yair Wiener, Qiryat Ono (IL); Ori Modai, Ramat-Hasharon (IL)

(73) Assignee: Avaya Inc., Basking Ridge, NJ (US)

( * ) Notice: Subject to any disclaimer, the term of this patent is extended or adjusted under 35 U.S.C. 154(b) by 536 days.

(21) Appl. No.: 14/601,505

(22) Filed: Jan. 21, 2015

(65) Prior Publication Data

US 2015/0215351 A1    Jul. 30, 2015

Related U.S. Application Data

(60) Provisional application No. 61/931,234, filed on Jan. 24, 2014.

(51) Int. Cl.
*H04N 7/14* (2006.01)
*G06T 19/00* (2011.01)
(Continued)

(52) U.S. Cl.
CPC ........ *G06T 19/006* (2013.01); *G06F 3/04842* (2013.01); *H04L 12/18* (2013.01); *H04L 12/1827* (2013.01); *H04L 65/403* (2013.01); *H04L 67/38* (2013.01); *H04N 7/15* (2013.01); *H04N 7/157* (2013.01); *H04N 13/0429* (2013.01); *G02B 27/01* (2013.01); *G02B 27/017* (2013.01); *G02B 2027/014* (2013.01); *G02B 2027/0178* (2013.01)

(58) Field of Classification Search
CPC .............. G02B 27/01; G02B 27/017; G02B 2027/014; G02B 2027/0178; G06F 3/04842; G06T 19/006; H04L 12/18; H04L 12/1827; H04L 65/403; H04L 67/38; H04N 13/0429; H04N 7/15; H04N 7/157
USPC ........................................ 348/14.01–14.16
See application file for complete search history.

(56) References Cited

U.S. PATENT DOCUMENTS

| 4,400,724 | A | 8/1983 | Fields |
|---|---|---|---|
| 5,272,526 | A | 12/1993 | Yoneta et al. |

(Continued)

FOREIGN PATENT DOCUMENTS

| KR | 20110066298 A | 6/2011 |
|---|---|---|
| WO | 2012135554 A1 | 10/2012 |

*Primary Examiner* — Hemant Patel

(57) ABSTRACT

Embodiments disclosed herein provide methods, systems, and computer readable storage media for facilitating controlling a meeting between remote Augmented Reality (AR) and Virtual Reality (VR) participants. In a particular embodiment, a method provides, during a conference session wherein a plurality of head mounted displays (HMDs) are each worn by one of a plurality of participants, compiling first orientation information and first view information from a first HMD of the plurality of HMDs. The orientation information describes current orientation of the first HMD. Based on the first orientation information and the first view information, the method provides determining a first change to how video is presented the first HMD. Also, the method provides directing the first HMD to implement the first change.

18 Claims, 9 Drawing Sheets

(51) Int. Cl.
*H04N 7/15* (2006.01)
*G06F 3/0484* (2013.01)
*H04L 29/06* (2006.01)
*H04N 13/04* (2006.01)
*H04L 12/18* (2006.01)
*G02B 27/01* (2006.01)

(56) References Cited

U.S. PATENT DOCUMENTS

| | | |
|---|---|---|
| 5,534,914 A | 7/1996 | Flohr et al. |
| 5,572,248 A | 11/1996 | Allen et al. |
| 5,745,161 A | 4/1998 | Ito |
| 6,330,022 B1 | 12/2001 | Seligmann |
| 6,409,599 B1 | 6/2002 | Sprout et al. |
| 6,545,700 B1* | 4/2003 | Monroe ............... H04M 3/567 348/14.07 |
| 6,583,808 B2 | 6/2003 | Boulanger et al. |
| 6,847,336 B1 | 1/2005 | Lemelson |
| 7,050,078 B2 | 5/2006 | Dempski |
| 7,057,582 B2 | 6/2006 | Ebersole |
| 7,340,399 B2 | 3/2008 | Friedrich |
| 7,346,654 B1 | 3/2008 | Weiss |
| 7,764,247 B2 | 7/2010 | Blanco |
| 7,990,889 B2 | 8/2011 | Beers et al. |
| 8,612,511 B2 | 12/2013 | Friedrich |
| 8,619,005 B2 | 12/2013 | Cok |
| 8,643,951 B1* | 2/2014 | Wheeler ............... G06F 3/012 359/630 |
| 8,690,581 B2 | 4/2014 | Ruf |
| 8,758,136 B2 | 6/2014 | Briggs et al. |
| 8,767,014 B2* | 7/2014 | Vaught ............... G02B 27/017 345/633 |
| 8,767,306 B1 | 7/2014 | Miao |
| 8,780,014 B2 | 7/2014 | Border |
| 8,786,675 B2 | 7/2014 | Deering |
| 8,888,576 B2 | 11/2014 | Briggs et al. |
| 9,142,062 B2 | 9/2015 | Maciocci et al. |
| 9,311,742 B1 | 4/2016 | Glover et al. |
| 9,384,594 B2 | 7/2016 | Maciocci et al. |
| 2002/0158873 A1 | 10/2002 | Williamson |
| 2003/0067536 A1 | 4/2003 | Boulanger et al. |
| 2004/0104935 A1 | 6/2004 | Williamson et al. |
| 2007/0279484 A1 | 12/2007 | Derocher et al. |
| 2009/0189974 A1 | 7/2009 | Deering |
| 2011/0085018 A1* | 4/2011 | Culbertson ......... H04L 12/1827 348/14.08 |
| 2011/0211036 A1 | 9/2011 | Tran |
| 2012/0024959 A1 | 2/2012 | Minagawa et al. |
| 2012/0038742 A1* | 2/2012 | Robinson ............... H04N 7/142 348/14.16 |
| 2012/0046072 A1 | 2/2012 | Choi |
| 2012/0046768 A1 | 2/2012 | Raoufi |
| 2012/0170800 A1 | 7/2012 | da Silva Frazão et al. |
| 2012/0197991 A1 | 8/2012 | Ramani et al. |
| 2012/0204120 A1 | 8/2012 | Lefar et al. |
| 2012/0249591 A1* | 10/2012 | MacIocci ............... G06F 3/011 345/633 |
| 2012/0262537 A1 | 10/2012 | Baker et al. |
| 2012/0274736 A1 | 11/2012 | Robinson et al. |
| 2012/0281059 A1 | 11/2012 | Chou et al. |
| 2013/0038632 A1 | 2/2013 | Dillavou et al. |
| 2013/0076853 A1* | 3/2013 | Diao ..................... H04N 7/157 348/14.08 |
| 2013/0141573 A1 | 6/2013 | Sutter et al. |
| 2013/0194304 A1 | 8/2013 | Latta et al. |
| 2013/0194389 A1 | 8/2013 | Vaught et al. |
| 2013/0297409 A1 | 11/2013 | Jones et al. |
| 2013/0303248 A1 | 11/2013 | Williams |
| 2014/0063178 A1 | 3/2014 | Krans et al. |
| 2014/0104368 A1 | 4/2014 | Tan |
| 2014/0117073 A1 | 5/2014 | Bell |
| 2014/0240444 A1 | 8/2014 | Szymczyk et al. |
| 2014/0300758 A1 | 10/2014 | Tran |
| 2015/0002541 A1 | 1/2015 | Dillavou et al. |
| 2015/0312520 A1 | 10/2015 | Nohria et al. |

* cited by examiner

CONTROL OF ENHANCED COMMUNICATION BETWEEN REMOTE PARTICIPANTS USING AUGMENTED AND VIRTUAL REALITY

RELATED APPLICATIONS

This application is related to and claims priority to U.S. Provisional Patent Application No. 61/931,234, entitled "Visual communication in augmented reality," filed on Jan. 24, 2014, and which is hereby incorporated by reference in its entirety.

TECHNICAL BACKGROUND

Conference call systems have long facilitated audio communications between participants at different locations. More recently some conference systems allow real-time video communications between participants. This allows a participant at one location to view live video and audio of other participants speaking even though those other participants may be very far away. Being able to view the other participants allows for a more productive conference as the participants can view each other's facial expressions, gestures, or other visual information that cannot be seen during an audio call.

While video conferencing has surely enhanced experience of remotely located participants, video conferencing falls short of making remote participants feel as though they are all in the same room. That is, participants sitting in a conference room watching other participants on a display screen does not adequately simulate those other participants being within the conference room. However, virtual reality headsets are now available that visually immerse users in visual experiences, such as video games. Similarly, augmented reality headsets are able to display information to a user while that user is still able to view the scene around them.

OVERVIEW

Embodiments disclosed herein provide methods, systems, and computer readable storage media for facilitating controlling a meeting between remote Augmented Reality (AR) and Virtual Reality (VR) participants. In a particular embodiment, a method provides, during a conference session wherein a plurality of head mounted displays (HMDs) are each worn by one of a plurality of participants, compiling first orientation information and first view information from a first HMD of the plurality of HMDs. The orientation information describes current orientation of the first HMD. Based on the first orientation information and the first view information, the method provides determining a first change to how video is presented by the first HMD. Also, the method provides directing the first HMD to implement the first change.

In some embodiments, determining the first change comprises using the first view information to determine a first view of a first participant wearing the first HMD and determining where to place one or more elements in the video relative to the first view.

In some embodiments, the one or more elements comprise video captured of one or more remote participants at locations remote to the one or more HMDs and wherein determining where to place the one or more elements comprises determining positions in a meeting room of the first HMD for each of the one or more remote participants from the perspective of the first view.

In some embodiments, determining the first change further comprises identifying a first object of interest in the first view and determining user one or more options for the first object. Determining the first change also comprises receiving first input from the first participant selecting a first option of the one or more options and, based on the first option and the first object, generating the one or more elements.

In some embodiments, the first object comprises a document and the one or more elements comprises a video representation of the document.

In some embodiments, the first input includes an instruction to present the one or more elements in video presented by each other HMD of the plurality of HMDs other than the first HMD, and the method further comprising directing the other HMDs to present video of the one or more elements.

In some embodiments, the first input comprises a head nod identified from second orientation information.

In some embodiments, the first input comprises a hand gesture made by the first participant.

In some embodiments, the first input comprises input by the first participant into a peripheral device.

In some embodiments, the first orientation information indicates that a first participant wearing the first HMD is leaning forward and determining the first change comprises determining a zoom level for the video corresponding to an amount in which the first participant is leaning forward.

In another embodiment, a conferencing system is provided for controlling a meeting between remote Augmented Reality (AR) and Virtual Reality (VR) participants, the conferencing system comprising a communication interface and a processing system. The communication interface configured to, during a conference session wherein a plurality of head mounted displays (HMDs) are each worn by one of a plurality of participants, compile first orientation information and first view information from a first HMD of the plurality of HMDs. The orientation information describes current orientation of the first HMD. The processing system configured to, based on the first orientation information and the first view information, determine a first change to how video is presented by the first HMD and direct the first HMD to implement the first change.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
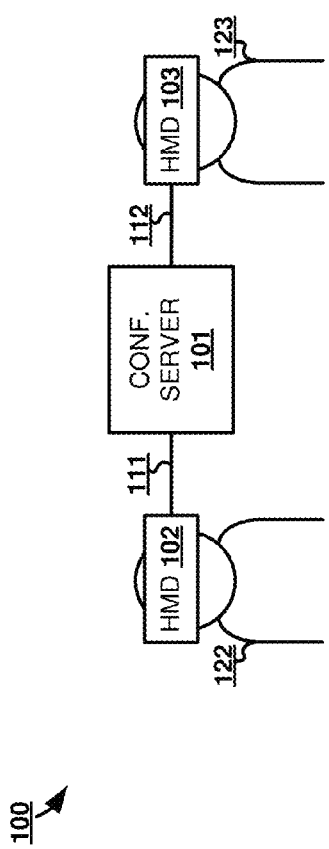
FIG. 1 illustrates a conferencing system for controlling enhanced visual communication between remote participants.

FIG. 1 illustrates conferencing system 100. Conferencing system 100 includes conferencing server 101, head mounted display (HMD) 102 and HMD 103. Conferencing server 101 and HMD 102 communicate over communication link 111. Conferencing server 101 and HMD 103 communicate over communication link 112.

In operation, conferencing server 101 is configured to provide a conferencing experience to conferencing participants at different locations as though the participants are at the same location. To do this, conferencing system 101 facilitates the presentation of augmented reality (AR) and virtual reality (VR) video to conference participants through HMDs. Any one conference could include all AR participants, all VR participants, or some combination of both AR and VR participants.

AR allows participants 122 and 123 to see the world around them while HMDs 102 and 103 overlay additional information. In some AR devices, such as a smartphone, the device captures video images and displays those images on a screen in a manner similar to using the screen as a viewfinder for a camera. AR information is overlaid on the displayed screen images in relation to what is displayed in the image. The AR information may be determined or stored locally by HMDs 102 and 103, such as an indicator drawing participant 122 or 123's attention to a particular point, while other information may be determined or stored by conferencing server 101 (or another system outside of HMDs 102 and 103), such as messages for a chat session. For example, information about a business having a storefront captured in the image may be displayed on the screen next to the storefront. In another example, a person in the AR view may have information displayed nearby the person, such as business card type information, so that it can easily be referenced. Alternatively, the AR information may be displayed on a see through medium, such as transparent lenses, which obviate the need to display the images that can be seen through the lenses.

In contrast, VR typically does not allow participant 122 or 123 to see the world around them. Participants 122 and 123 are therefore immersed in visuals provided by respective HMDs 102 and 103. VR may display a real world scene captured for VR presentation or may display a virtual scene generated by a computer system. Regardless of whether the scene is real or virtual, VR video is able to overlay information not in that scene in a manner similar to AR. In some embodiments, HMD 102 or 103 may be configured to present both AR and VR video. In such cases, a conferencing session may switch from AR to VR, or vice versa, when presented by HMDs 102 and 103 to participants 122 and 123, respectively. For example, while presenting AR video, participants physically located with participant 122 may leave the location. Once that happens, HMD 102 may switch from presenting AR video to presenting VR video since participant 122 no longer needs to view the other participants at the location.

For the purposes of facilitating a conference, HMDs 102 and 103 in cooperation with conferencing server 101 use AR or VR video to present captured video of conference participants not co-located with one another. For example, participant 122 is at one location while participant 123 is not. Participant 123 may be in a room down the hall from participant 122 or may be on the other side of the world. Regardless of where participant 123 is located, HMD 102 worn by participant 122 allows participant 122 to view video of participant 123 at a position in the same location as participant 122. In this manner, the video viewed of participant 123 by participant 122 in HMD 102 may be captured and transferred to conferencing server 101 by one or more 2D or 3D video image capture devices co-located with participant 123 though not shown in conferencing system 100. Thus, rather than merely viewing video captured of participant 123 on a display, participant 122 can "see" participant 123 at participant 122's location thereby emulating the experience of participant 123 actually being co-located with participant 122.

In addition to displaying the video of remote participants, HMDs 102 and 103 can display additional information to participants 122 and 123. This information may include text or video communications with a subset of conference participants, information about the other conference participants (e.g. business card type information), documents being discussed during the conference (either physical or stored in a computer storage system), markings on a physical whiteboard, or any other type of information that can be conveyed visually through an HMD regardless of whether that information is related to the conference. To determine whether information should be displayed, what information to display, how the information should be displayed, and how to adjust the video based on HMD movement, the embodiments herein describe ways in which conferencing system 100 can be controlled by participants 122 and 123 or any other participants on a conference.

Figure 2:
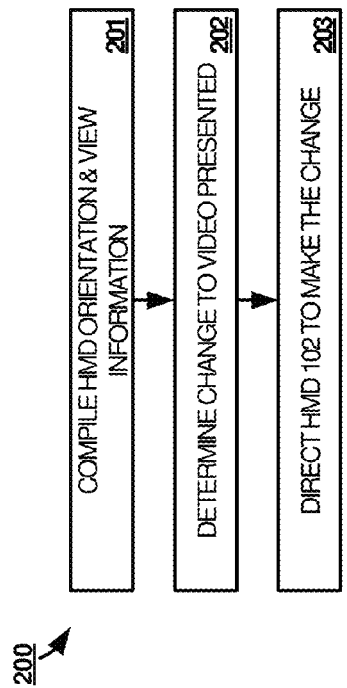
FIG. 2 illustrates a method of operating a conferencing system for controlling enhanced visual communication between remote participants.

FIG. 2 illustrates a method 200 for operating conferencing system 100 to control a meeting between remote AR and VR participants. Methods 200 is described below from the perspective of HMD 102 and participant 122, although, the same steps may be concurrently be performed from the perspective of HMD 103 and participant 123 or any other HMD connected to a conferencing session. The same can be said for method 300 presented further below. During the conferencing session between at least participants 122 and 123 wearing HMDs 102 and 103, method 200 provides compiling first orientation information and first view information from HMD 102 (step 201).

The orientation information describes current orientation of HMD 102, which corresponds to the orientation of participant 122. For example, the orientation information may describe that HMD 102 is tilted up, down, left, right or to the side, is turned in one direction, has moved within space (e.g. as may happen if participant 122 leans back or forward or otherwise moves around), or some other information relevant to the orientation of an HMD. In some cases, the orientation information may describe the orientation of HMD 102 relative to a default orientation. In other cases, the orientation information may simply describe differences in orientation from previous orientation information. Alternative ways of expressing orientation information may also be used. The orientation information may be compiled from a gyro sensor(s), accelerometer(s), compass, video cameras, or any other type of sensor that could provide information relevant to an HMD's orientation. In some examples, portions of the orientation information may be provided by sensors external to HMD 102, such as room proximity sensors or external cameras.

The view information describes what participant 122 is viewing through HMD 102. If HMD 102 is displaying AR video, then participant 122's view includes portions of the physical location in which participant 122 is located as seen through HMD 102. Accordingly, the view information may include video captured from a camera facing outward from HMD 102 to capture images of what participant 122 is seeing. Alternatively, if HMD 102 is displaying VR video, then participant 122's view is simply what is being displayed by HMD 102. As with the orientation information, in some examples, the view information may be provided by sensors, such as video cameras, both internal to and external from HMD 102. Furthermore, some types of information compiled in step 201 may be used as both view and orientation information.

Based on the first orientation information and the first view information, method 200 provides determining a change to how video is presented the first HMD (step 201). As noted above, HMD 102 presents video to participant 122 so that participant 123 looks as though he or she is at the same location. For example, if participant 122 is in a conference room, then video of participant 123 may be presented at a chair position in the conference room to visually simulate participant 123 being seated with participant 122 in the conference room. As participant 122 moves their head, HMD 102 moves with it and HMD 102's orientation changes along with the view of participant 122 through HMD 102. Thus, the presentation of the video of participant 123 must also change so that participant 123 remains at the same chair position (e.g. if participant 122 turns their head to the right while participant 123 is in view, then the video presentation must move participant 123 to the left so that participant 123 remains at the same position in the conference room). Additionally, if participant 122 were to lean forward or backward, the video presented of participant 123 would have to zoom in or out to replicate participant 123 being located closer or further from participant 122. Likewise, in the case of VR video, if participant 122 were to move their head, or lean, then the background must also be moved accordingly, or zoom, accordingly. Moreover, in VR configurations, the zoom amounts may not be limited by the need to simulate a real meeting room experience. Rather, participant 122 may be able to lean forward and zoom in as far as they desire before stopping the zoom by leaning back to a normal position. Similar principles also apply to visual objects other than remote participants that are presented to participant 122 in HMD 102.

Once the change has been determined, method 200 provides directing HMD 102 to implement the change (step 203). Accordingly, participant 122 is able to control the video presented to them by HMD 102 by moving their head upon which HMD 102 is worn. This movement is represented by the orientation and view information discussed above to control the video presented to participant 122 during the conference session. As updated orientation and view information continue to be compiled, the video will continue to be controlled in accordance with participant 122's movement.

It should be understood, that all or portions of method 200 may be performed by HMD 122 or conferencing server 101. In some cases, additional computing systems, such as a room conferencing system co-located with HMD 102 or 103, may also be used to perform portions of method 200. Which system performs which portions of method 200 may depend on processing capabilities of each system, network latency between systems, load balancing, or some other factor—including combinations thereof.

In method 200 above, HMD 102 displays participant 123 to participant 122 in a manner that visually seems to participant 122 that participant 123 is co-located. In AR configurations, a location in participant 122's location may need to be selected for participant 123 (e.g. a location around a conference table). Likewise, participant 123 may need to be positioned in a VR configuration if participant 123 is not located at the location presented in the VR video. Additionally, locations, such as on a table, nearby a participant, or otherwise, may need to be determined for other objects, real or virtual, that may be displayed as video elements to participant 122. Some example objects may include documents, whiteboards, 3D objects (e.g. a product for discussion during the conference session), chat windows, personal information, or other type of objects. In some cases, the determined location for an element may simply comprise a location in the video displayed by the HMD without regard to a position in the HMD's view. For example, a chat window may simply be placed in a corner of the video so as to not interfere with other elements in the view. Thus, the change in view determined at step 202 and implemented at step 203 therefore may include the appearance, modification, updating, etc. of visual elements other than participants in the conferencing session.

Figure 3:
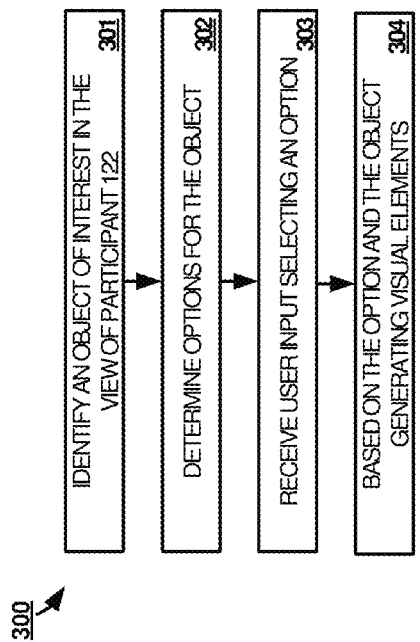
FIG. 3 illustrates a method of operating a conferencing system for controlling enhanced visual communication between remote participants.

FIG. 3 illustrates a method 300 for controlling which elements are displayed to participant 122 in an exemplary embodiment. In particular, method 300 provides means by which participant 122 can opt for certain visual elements to be displayed to themselves or to other participants in the conferencing session. Method 300 provides identifying a first object of interest in the view of participant 122 through HMD 102 (step 301). As discussed above, the view information compiled at step 201 is used to determine the view. The view is segmented and analyzed to determine what object(s) in the view, either physical or visually presented by HMD 102, upon which participant 122 is focused. The object may be another participant, a document, a projected slide, a whiteboard, something a participant is holding, something placed on a table, or any other object that participant 122 may view. In some examples, HMD 102 may display a visual cue, such as a cross hair, rectangle, circle, or otherwise, to indicate to participant 122 a location in the view that will be targeted for object identification and extraction. The object may be identified using clustering techniques on the view from HMD 102, detecting a whiteboard according to glare, or any other way for identifying objects in a video image.

In some cases, HMD 102 or another device co-located with participant 122 may include an eye tracking system that can track the gaze point of participant 122 in order to increase the accuracy of the object identification. The eye tracking system may also assist in the zoom functions discussed above by following the focus level of participant 122's eyes to determine whether participant 122 is attempting to zoom in or out.

Method 300 then provides determining one or more options for the identified object (step 302). The options are dependent on the object itself. For example, if the object is another participant, then the options may include display information about the participant (e.g. business card information and the like), open up a private chat window with the participant, increase the volume of that participant's speech, or other participant related action. The participant may be identified using face recognition, a visual ID, or by some other means. In an alternative example, if the object is a document, then the options may include displaying the document in HMD 102 and/or on the HMDs of other participants, opening the document for editing in HMD 102, or some other document related action. In some examples, HMD 102 may display a list of the one or more options to participant 122 while in other examples participant 122 may be expected to know the options available for each possible type of identified object.

Receiving first input from participant 122 is provided by method 300 to select an option of the one or more options (step 303). The input may be a head nod up or down, a wink of one eye or the other, a blink or blink sequence, a hand gesture made in the air (e.g. hand swipe in front of participant 122), input into a physical element of HMD 102 (e.g. a button, toggle, etc.), input into an external device, such as a smartphone, tablet, dedicated peripheral, etc., or any other type of input. In some cases, if HMD 102 displays the possible options, then HMD 102 may also display the action needed to select any particular option. In some cases, there may only be one option, such as displaying a document to other participants in their HMDs, and participant 122 need only to continue looking at the document (e.g. long stare) in order to select the option for displaying the document.

Once the option has been selected, method 200 provides generating the visual elements based on the selected option and the identified object (step 304). Generally, the elements generated for video display provide the information requested by the selected option for the selected object and may include visual representations of the object itself. If the visual elements comprise video or still imagery of the object itself, then the background may be removed, the object may be cropped if not the entire object need be viewed, presentation angle may be changed (e.g. to align a document), or some other form of processing may be performed.

For example, if the object is another participant and the option is to open up a communication with that participant, then the generated visual element would include a communication window. The communication window may be displayed nearby the other participant for context or may be displayed elsewhere in the view provided by HMD 102. Similarly, the identified object may be a medium for writing, such as paper, a smartphone, a laptop, or otherwise, upon which participant 122 is writing/typing a message. HMD 102 may recognize this fact at step 301 and present participant 122 with options at step 302 to send the message to other participants. Input received at step 303 selects to which participants the message should be sent and step 304 generates the elements (e.g. communication visuals) that will be displayed by HMD 102 and the HMDs of the selected participants.

In another example, the object identified at step 301 may be a whiteboard upon which participant 122 is marking. The system may then examine an area of interest on the whiteboard to determine whether the entire whiteboard is relevant or merely a portion based on the subject matter in the area of interest, the subject matter elsewhere on the whiteboard (if any markings exist elsewhere), where specifically participant 122 is marking, or any other information that may help such a determination. Participant 122 may select an option to display the whiteboard, or portion thereof, as the result of steps 302 and 303. Step 304 then generates the visual elements for displaying the whiteboard to other participants in their HMDs. The whiteboard may be converted into a visual element from video captured by HMD 102, by other HMDs co-located with HMD 102, or other capture devices co-located with HMD 102.

In yet another example, the object identified at step 301 may be a business card, as may be the case if participant 122 wants to share their business card with other participants. Options determined at step 302 may include saving the business card information or presenting the business card information to other participants (e.g. next to the participant who the business card represents, in the corner of each participants HMD display, or elsewhere). Step 303 receives input from participant 122 to select the desired option and then step 304 generates visual elements to display the information to the other participants and confirm that the selected option has been performed to participant 122.

When the objects are being presented as visual elements to other participants through their respective HMDs, the system may share live representations of the objects (either captured by HMD 102 or another HMD or device) or may share a snapshot of the object. Live sharing is beneficial when the object is constantly changing and continual visual on the object would be beneficial, as may be the case with a whiteboard, a video, a moving object (e.g. a rotating object), etc. Live sharing may be initiated by identifying the object to be shared at step 301 and then participant 122 continuing to look at the object acts as participant 122 selecting the option to share a visual representation of the object to other participants. To stop the live sharing, participant 122 may simply look away from the object or some configurations may allow for participant 122 to look away from the object while it is still being presented. In those configurations, participant 122 may be able to swipe away a visual element representing the object in HMD 102 to end the presentation. The swipe may be performed via a hand gesture captured by HMD 102 or another device, or input into a peripheral device (e.g. a touchpad), by head movement meant to swipe the object out of view, or by some other means.

Alternatively, snapshot sharing is beneficial when the presented object will be static for a relatively long period of time, such as a presentation slide, document page, and the like. Static objects can be captured as a single still image, which can then be presented as visual elements in an HMD. Accordingly, participant 122 will have to take an action, such as the swipe action described above for live sharing, in order to stop presenting the static object element to other participants, as simply looking away from the object would defeat the purpose of snapshot sharing. Likewise, if the snapshot presentation comprises a series of images, the participant action may progress through the slides before dismissing the slides at the end of the presentation.

In addition to selecting options and directing presentation of objects, hand gestures may be used to engage in conference session without speaking. For example, participant 123 may raise their hand (or other bodily gesture) and that hand raise may be recognized by HMD 103, another co-located HMD, or other capture device. Recognition of the hand raise may allow conferencing system 100 to bring participant 123 to the forefront in the meeting room, as may be the case if the meeting room (either physical or virtual) is too small to "hold" all remote participants and, therefore, only certain participants are shown at any given time (e.g. the most recent speakers). Also, recognition of a hand raise, or other type of motion, may be used for polling purposes. For example, if participants are asked to vote on various options, they may raise their hands and conferencing server 101 may tally the number of participants who voted for each option (and possibly who voted as well).

Figure 4:
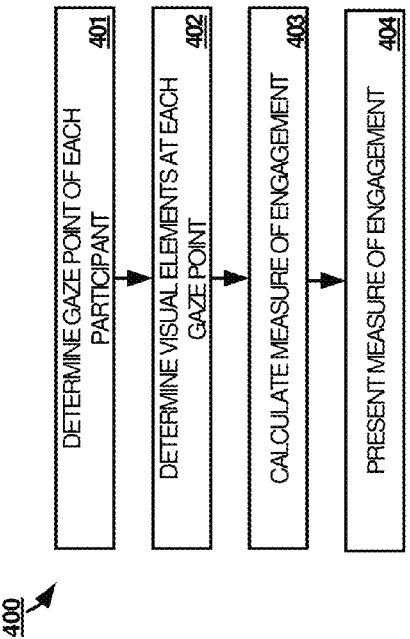
FIG. 4 illustrates a method of operating a conferencing system for controlling enhanced visual communication between remote participants.

In some embodiments, the orientation and view information received from each participant's HMD to measure the engagement of each participant in the conference. FIG. 4 illustrates method 400 in an example implementation of controlling engagement in a conferencing session. Method 400 provides determining gaze point of each participant in the conferencing session based on the orientation and view information compiled from each participant's HMD (step 401). The orientation information may be augmented with eye tracking information for each participant to enhance the accuracy of the gaze determination. Method 400 then provides determining the visual elements located at each gaze point (step 402). In the case of AR HMDs, the gaze point may be over an element physically located with a participant or an element displayed by the HMD. Since each HMD may display visual elements differently (e.g. different locations, different perspectives, etc.), gaze point may be in different locations for each participant even if participants are looking at the same element.

From the determined visual elements, method 400 provides calculating a measure of engagement for participants on the conference (step 403). For example, the measure may indicate a percentage of the participants looking at a particular element, such as a presentation slide. A high percentage would indicate that the engagement level for the presentation is high. Alternatively, the measure of engagement may indicate multiple elements are being focused on by the participants (e.g. chat windows, an irrelevant portion of the presented slide, etc.) and the engagement level may be low. Method 400 therefore further provides presenting the measure of engagement (step 404). The measure may be presented globally to all participants or to a participant that is the conference moderator or the current presenter in the conferencing session. That participant may use the measure of engagement to adjust the presentation in real-time to increase the measure of engagement. Alternatively, the measure of engagement may be presented after the conference session is completed for analysis, such as during a replay of the conference session from a recording. Moreover, the measure of engagement may include sub-measures for each participant so that the engagement level of a particular participant can be analyzed.

Figure 5:
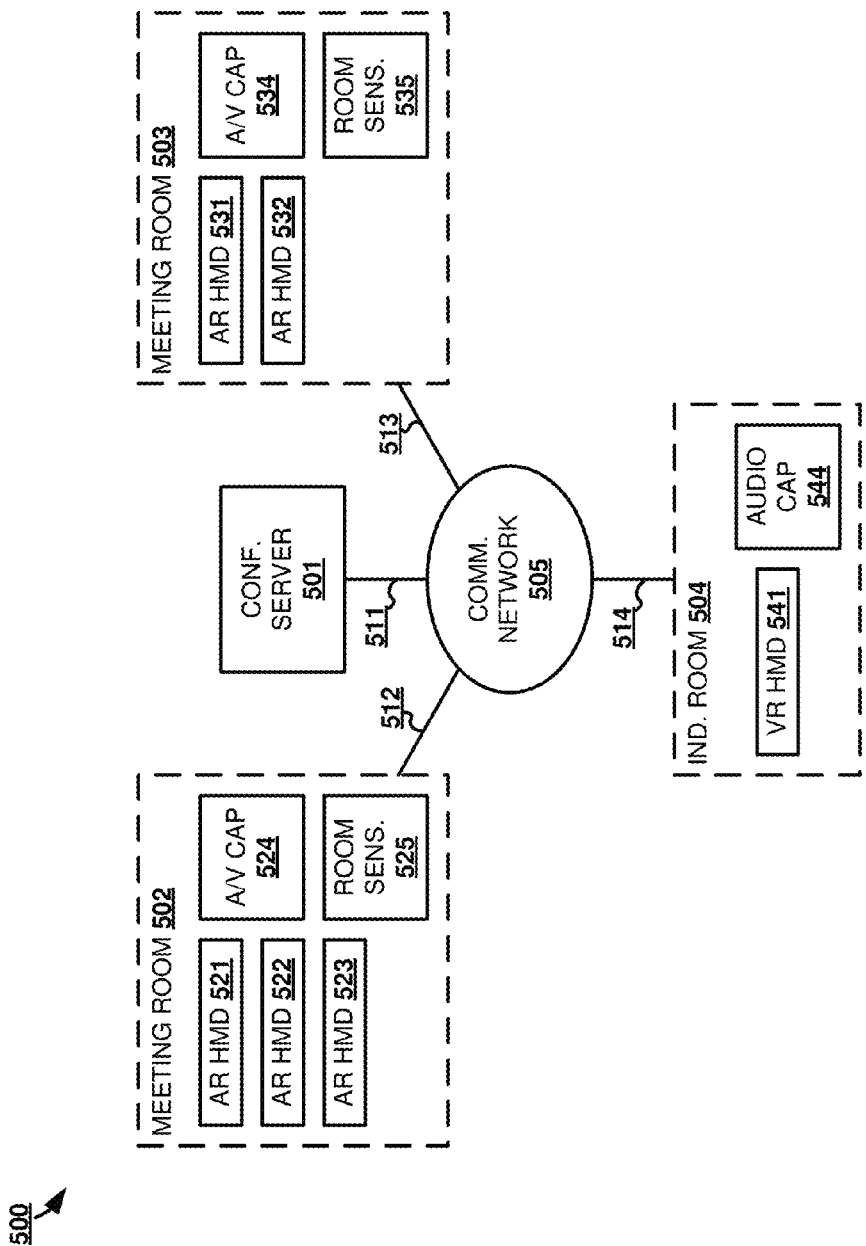
FIG. 5 illustrates a conferencing system for controlling enhanced visual communication between remote participants.

FIG. 5 illustrates conferencing environment 500. Conferencing environment 500 includes conferencing server 501, meeting room 502, meeting room 503, individual room 504, and communication network 505. Meeting room 502 includes AR HMDs 521-523, audio/video capture devices 524, and room sensors 525. Meeting room 503 includes AR HMDs 531-532, audio/video capture devices 534, and room sensors 535. Individual room 504 includes Virtual Reality (VR) HMD 541 and audio capture device 544. Communication network 505 communicates with conferencing server 501, meeting room 502, meeting room 503, and individual room 504 over communication links 511-514, respectively. It should be understood that, in some cases, the functionality of conferencing server 501 may be distributed rather than in a centralized system. For example, the same features could be had in a peer-to-peer communication between the HMDs with the peer-to-peer network being the conferencing system.

Communication network 505 comprises network elements that provide communications services to rooms 502-504 and conferencing server 501. Communication network 505 may comprise switches, wireless access nodes, Internet routers, network gateways, application servers, computer systems, communication links, or some other type of communication equipment—including combinations thereof. While shown as a single network, communication network 505 may comprise a collection of networks including local area networks, wide area networks, the Internet, or any other type of computing network—including combinations thereof.

Audio/video capture devices 524 and 534 comprise components, such as 2D or 3D cameras and microphones, that are used to capture video and audio of meeting rooms 502 and 503 and the participants located therein. A/V capture devices 524 and 534 may further include circuitry for wired or wireless networking, such as an Ethernet interface, Wi-Fi interface, Bluetooth module, or other type of communication interface. In some examples, certain components of A/V capture devices 524 and 534 may be included in AR HMDs 521-523 and 531-532.

Room sensors 525 and 535 include components that capture information used to determine participant position and view. Sensors 525 and 535 may include proximity sensors, RFID tags, infrared tags, compasses, sonic sensors, accelerometers, gyro sensors, or any other components that may provide relevant information. At least some of the components of sensors 525 and 535 may be incorporated into HMDs 521-523 and 531-532 and A/V capture devices 524 and 534.

In some examples, each of rooms 502-504 may further include an intermediate computer system that communicates with each rooms HMDs, A/V capture devices, and room sensors. The intermediate computer systems then communicate with conferencing server 501. In some configurations, some of the functions performed by conferencing server 501 may be handled by these intermediate computer systems on behalf of conferencing server 501.

Using the methods and operations described above, conferencing server 501 facilitates a meeting between participants wearing the HMDs in environment 500. In particular, the AR HMDs display remote participants within the meeting room where the respective AR HMDs are located. The VR HMD presents either a virtual meeting room into which the AR HMD participants are placed or the meeting room presented to the VR participant is one of meeting rooms 502 and 503 into which the VR participant is "positioned."

Figure 6:
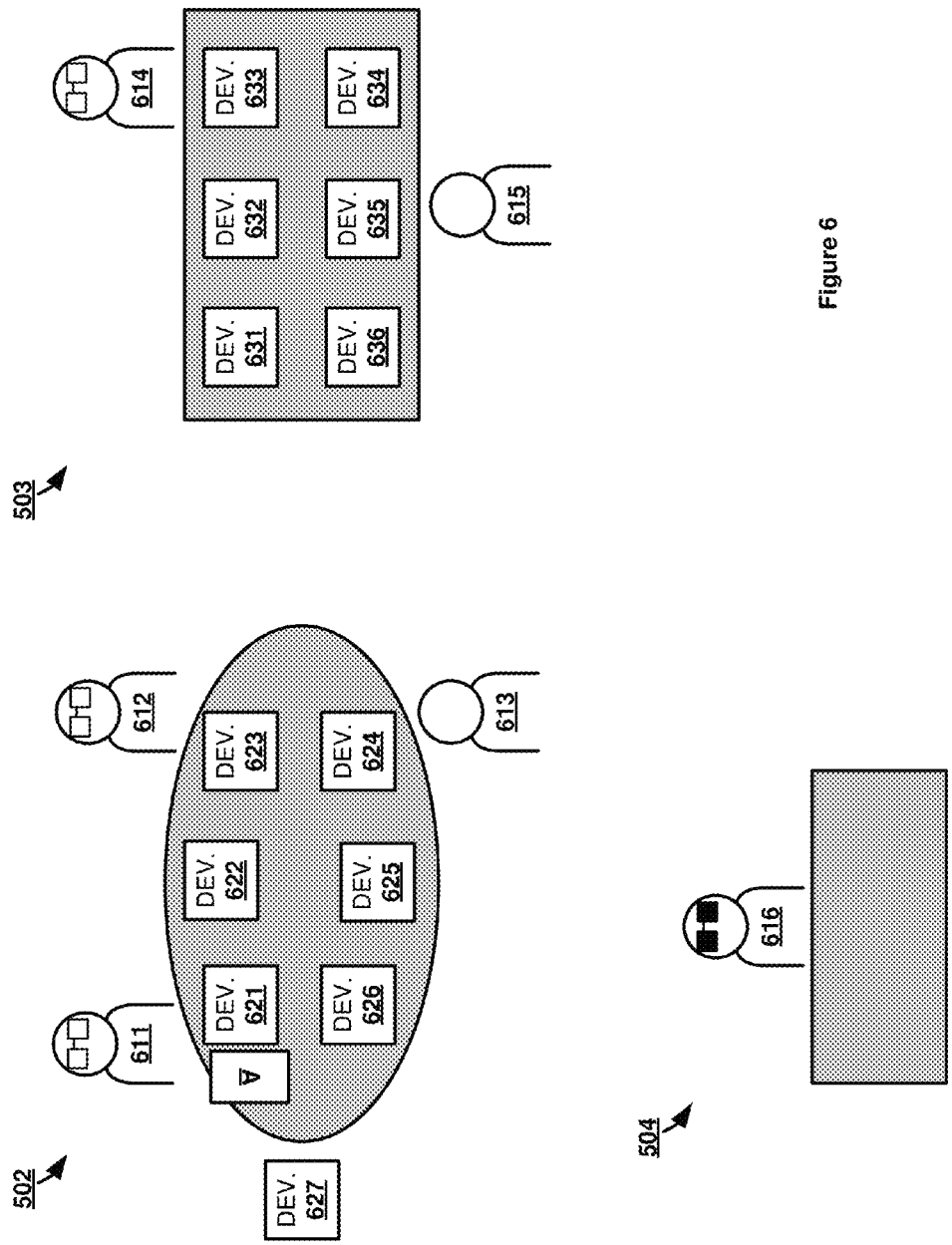
FIG. 6 illustrates example room orientations when controlling enhanced visual communication between remote participants.

FIG. 6 illustrates an example orientation of participants within rooms 502-504. In particular, meeting room 502 includes participants 611-613 who are wearing AR HMDs 521-523, respectively. Meeting room 503 includes participants 614 and 615 who are wearing AR HMDs 521-523, respectively. Independent room 504 includes participant 616 wearing VR HMD 441. In this example, meeting room 502 includes a conference table having six seating positions with a device 621-626 at each position. Each device 621-626 includes components of A/V capture devices 524 and room sensors 525. Meeting room 503 includes a conference table also having six seating positions with a device 631-636 at each position. Each device 631-636 includes components of A/V capture devices 534 and room sensors 535. Furthermore, in this example, audio capture device 544 is incorporated into VR HMD 541.

In operation, devices 621, 623, 624, 633, and 635 all have participants at their respective locations. Accordingly, once the conferencing session has started, these devices begin capturing audio and video of their respective participants and transferring that captured audio and video to conferencing server 501. Devices 622, 625, 626, 631, 632, 634, and 636 do not have participants at their positions but still capture audio and video to provide additional angles of the participants, which may be needed for presentation to remote participants. Additionally, each of AR HMDs 521-523 and 531-532 includes outward facing video cameras that capture and transfer video to conferencing server 501, which uses the video to determine a view of each participant and could also be used to generate additional angles of other participants in the room. Moreover, capture device 627 captures video of meeting room 502 for use in VR video and provide the visual prospective of the conference for participant 616 through VR HMD 541. It should further be understood, that device 627 may be used to capture AR video in addition to the VR video discussed in this example.

Upon receiving the audio, video, and other sensor information, conferencing server 401 performs the steps described in operations 300 or 400 above. Those operations allow conferencing server 401 in conjunction with the AR and VR HMDS to provide AR and VR video necessary for participants 611-616 all experience the conference session as though they are all in the same room.

Figure 7:
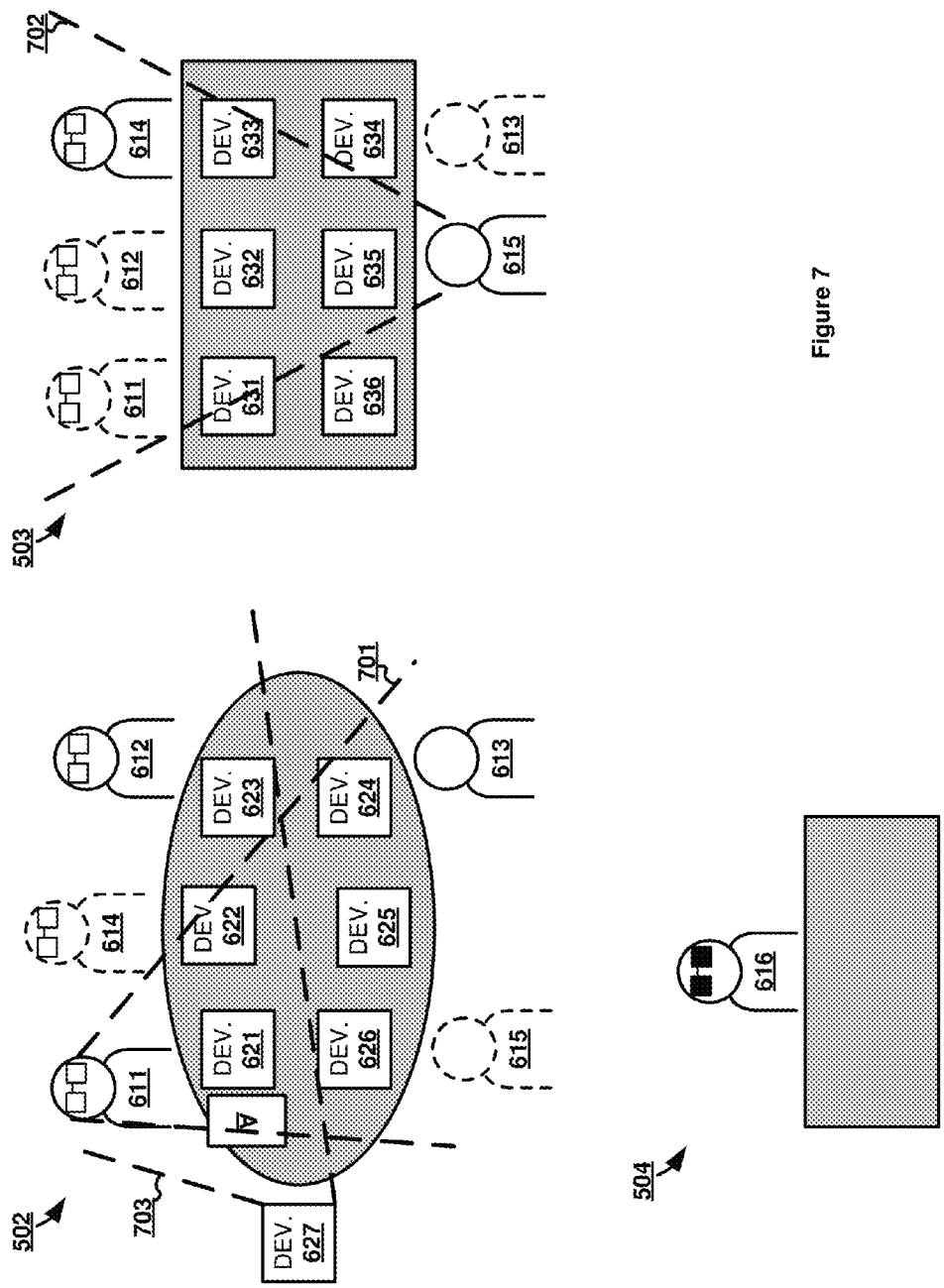
FIG. 7 illustrates example room orientations when controlling enhanced visual communication between remote participants.

FIG. 7 illustrates an example orientation of participants within rooms 502-504 once the participants are viewing the conference session through video provided by conferencing server 501. Specifically, as shown, conferencing server 501 has determined positions within each room 502 and 503 for the participants remote to each room. No position was determined for participant 616 in this example because no video was captured of participant 616, although, audio from participant 616 may be presented from a particular position. However, in some examples, video may be captured of participant 616 and, therefore, the open spot in each of rooms 502 and 503 may be taken by participant 616. Alternatively, participant 616 may be represented by an avatar or other graphical representation in place of real-time video of participant 616.

When viewed through their AR HMDs, participants 611-613 at room 502 are able to see video of participants 614-615 at positions in room 502 as though participants 614-615 are located in room 502. Likewise, participants 614-615 at room 503 are able to see video of participants 611-613 at positions in room 503 as though participants 611-613 are located in room 503. Image segmentation techniques discussed above allow the video image of each remote participant to be separated from the background image. Thus, local participants do not see video of the room in which the remote participants are physically located. In a particular example, view 701 is what participant 611 sees through their AR HMD 521. Even though the position of participant 615 is physically empty, the AR video presented to participant 611 makes it seem as though participant 615 is at that position. Similarly, view 702 is what participant 615 sees through their AR HMD 532. Even though the positions of participants 611 and 612 are physically empty, the AR video presented to participant 615 makes it seem as though participants 611 and 612 are at those positions.

As views 701 and 702 change (e.g. as participants 611 and 612 tilt or pan their heads), conferencing server 501 tracks those view changes and adjusts the video, or the processing information that an AR HMD would use to change and adjust the video, for each participant accordingly to ensure the remote participants continue to be presented in their correct positions. As discussed above, orientation and view information may be compiled from the HMDs and capture devices in rooms 502 and 503 and transferred to conferencing server 501 to indicated that views 701 and 702 are changing. As such, in the case of view 701, as participant 611 turns their head more to the left, the AR video may no longer present participant 612 since participant 612 moves out of view and presents participant 614 "sitting" next to participant 611 as participant 614 moves into view. Thus, the orientation and view information allows participant 611 to control what they see through HMD 521 in accordance with their movement.

Regarding participant 616, the VR video presented to participant 616 comprises view 703 captured by device 627. VR HMD 541 presents video of both meeting room 502 and participant 614 with the video of participant 614 overlaid on the video of meeting room 502 in the seating position between participants 611 and 612. Since the meeting room scene includes participants 611 and 612, who are physically located in meeting room 502, separate video of participants 611 and 612 is not necessary. As participant 616 moves their head to the right, view 703 changes and participant 613 comes into view as captured by device 627. Additionally, further to the right, video of participant 615 is further overlaid into the VR video such that participant 616 is able to see participant 615 as though participant 615 is in room 502. Device 627 may need to move itself to capture view 703 in accordance with participant 616's head movements or device 627 may capture video wide enough that only the portion of that wide angle view displayed by VR HMD 441 changes.

Additionally, to increase the effectiveness of the AR video, audio from each remote participant is played from the device at that participant's position. For example, if participant 614 is speaking, then device 622 will present the audio of participant 614 so that participants 611-613 hear participant 614 as though participant 614 is actually at the position in room 502 presented in the AR video. Alternatively, each of AR HMDs 521-523 may include audio speakers arranged in such a way as to simulate the audio coming from the position of participant 614 in room 502. Furthermore, any device in rooms 502 and 503 may present the audio captured for participant 616. However, if a position is determined for participant 616 in either or both of rooms 502 and 503, then the audio may be presented as though it comes from that determined position.

Figure 8:
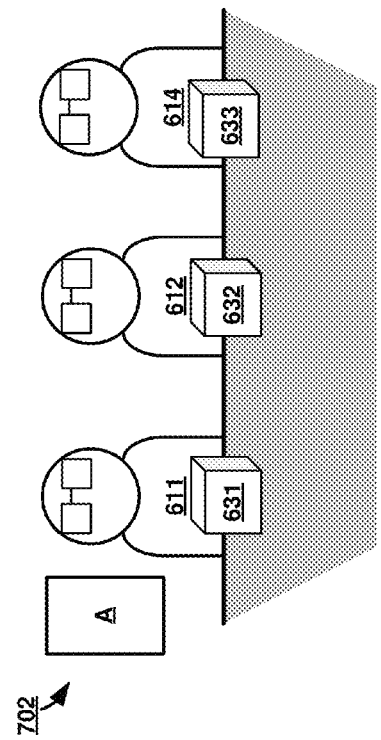
FIG. 8 illustrates an example participant view when controlling enhanced visual communication between remote participants.

FIG. 8 illustrates view 702 from the perspective of participant 615 once a meeting has started and remote participants are displayed by AR HMD 532 to participant 615. As previously shown in FIG. 7, remote participants 611 and 612 are positioned in the two positions next to local participant 614. Therefore, AR HMD 532 displays video of participants 611 and 612 in their determined positions while participant 614 does not need to be presented since he or she is co-located with participant 615. Furthermore, when displaying the video of participants 611 and 612 objects that are between the positions of participants 611 and 612 (i.e. devices 631 and 632) are accounted for by displaying the video of participants 611 and 612 as being obscured by devices 631 and 632.

If participant 615 were to turn their head, to the right in this example, orientation information about the orientation of AR HMD 532 and view information about view 702 would indicate that participant 615's head is turning. Accordingly, AR HMD 532 changes the video to account for the movement and ensure participants 611 and 612 continue to be presented at their proper locations in room 503. In particular, the video of participant 611 may move out of view and no longer be displayed while video of participant 613 comes into view. In that example, participant 613 may be shown from a profile view unless participant 613 is "looking at" participant 615 to best display participant 613 as though he or she is physically sitting next to participant 615. Accordingly, by displaying remote participants from the proper angle, accounting for objects that may obscure the view of participants at their designated positions, and adjusting for movement of participant 615, as AR HMD 532 does in this embodiment, participant 615 is able to view the remote meeting participants as though they are locating in room 503 with participant 615.

Figure 9:
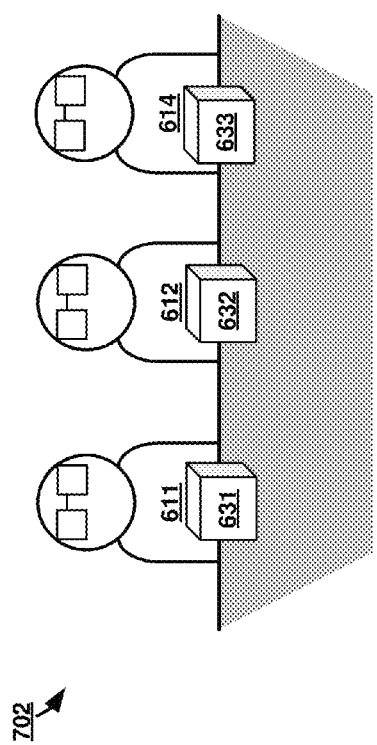
FIG. 9 illustrates an example participant view when controlling enhanced visual communication between remote participants.

FIG. 9 also illustrates view 702 from the same perspective of participant 615 once a meeting has started. As can be seen in room 502, as illustrated in FIGS. 6 and 7, document 'A' is resting on the table in front of participant 611. The orientation and view information received about HMD 521 of participant 611 is used by conferencing server 101 to determine that participant 611 is looking at document 'A'. Accordingly, a snapshot is taken of document 'A' by HMD 521, document 'A' is isolated in the snapshot image, and then presented to participant 615 in view 702 and the other participants in the meeting within their respective views. Specifically, document 'A' is displayed to the left of participant 611 in view 702, although, document 'A' may be displayed in other locations of view 702. In some examples, the content of document 'A' may be examined to find a soft copy of document 'A' on a storage medium accessible by conferencing server 501. The soft copy may therefore be displayed in place of a snapshot image.

Participant 611 may further be presented with document 'A' or an indication that document 'A' is being presented to the other participants. Participant 611 may use a hand gesture or use a peripheral device to "swipe" document 'A' away and stop the presentation of document 'A'. Participant 615 may use a similar action if participant 615 no longer desires to view document 'A' in view 702. Moreover, additional options may be presented to all participants in the meeting, such as saving the document, zooming in on the document, or otherwise. The options may be invoked using head movements, hand gestures, input into control devices, or by other means.

Additionally, it should be understood that, while the example above uses a document, other objects may be presented in a similar manner, such as a whiteboard, portion of a whiteboard, business card, business card information, communication (e.g. chat) window, or three dimensional object. For example, when participant 615 is determined to be looking at participant 611 participant 615 may have the option of nodding (or providing a voice command, hand gesture, etc.) to show participant 611's contact information, which may be displayed in a manner similar to that of document 'A'.

Figure 10:
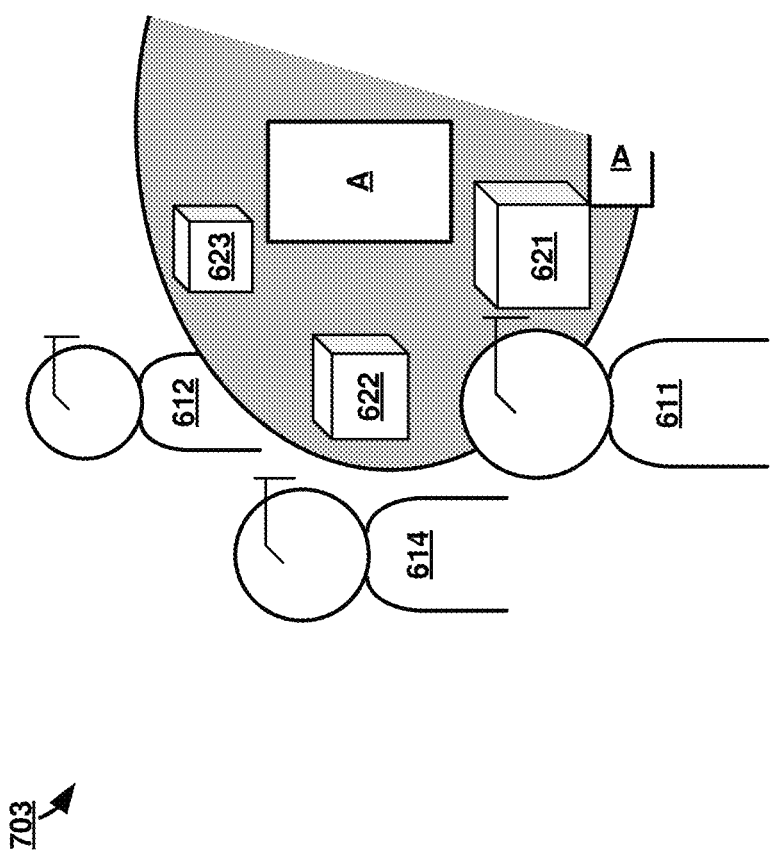
FIG. 10 illustrates an example participant view when controlling enhanced visual communication between remote participants.

FIG. 10 then illustrates view 703 from the perspective of participant 616 once a meeting has started. Since participant 616 is a virtual reality participant, the view of room 504 is irrelevant and is not incorporated into the video displayed through VR HMD 541. The meeting room presented to participant 616 is video captured of meeting room 502 rather than rendering a virtual meeting room for presentation. Since the video is actual video of meeting room 502, participants physically located within room 502 are already included in that video. However, participant 614 is remote to room 502 and video of participant 614 is therefore overlaid on the video of room 502. Moreover, participant 614 is shown from a profile view to account for participant 614's position relative to view 703. Of course, if participant 614 were to turn towards participant 616, then the orientation of the video of participant 614 would change to show participant 614 facing participant 616.

Additionally, since the position of participant 614 is somewhat obscured by participant 611, video of participant 614 is presented such that participant 614 looks as though he or she is partially behind participant 611 as would be the case if participant 614 was physically in room 502. If participant 616 were to move their head to the right, the video of meeting room 502 may pan to the right and the overlay of participant 614 may move out of view while an overlay of participant 615 moves into view. Furthermore, as in the AR example above, additional visual information, such as conference slides, chat windows, etc., may also be presented in the VR video to participant 616.

Consistent with the example shown in FIG. 9, document 'A' is displayed in view 703. While VR HMD 541 can display anything that an AR HMD can, further control may be granted to participant 616 because VR HMD 514 can manipulate the displayed background as well. For example, participant 616 may be able to zoom into other participants or areas of the meeting room by leaning forward until the zoom level reaches a desired setting whereas an AR HMD may need to keep displayed elements consistent with the real world location of the participant.

Figure 11:
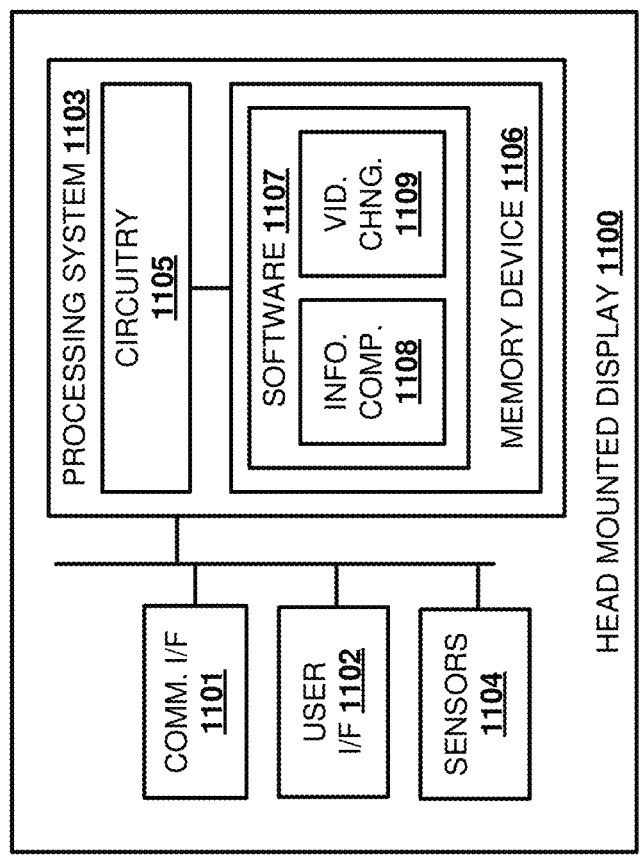
FIG. 11 illustrates a head mounted device for controlling enhanced visual communication between remote participants.

FIG. 11 illustrates head mounted display 1100. Head mounted display 1100 is an example of head mounted display 103, although head mounted display 103 could use alternative configurations. Head mounted display 1100 comprises communication interface 1101, user interface 1102, processing system 1103, and sensors 1104. Processing system 1103 is linked to communication interface 1101 and user interface 1102. Processing system 1103 includes processing circuitry 1105 and memory device 1106 that stores operating software 1107. Head mounted display 1100 may include other well-known components such as a battery and enclosure that are not shown for clarity. Head mounted display 1100 may be a personal computer, server, or some other computing apparatus—including combinations thereof. In some examples, head mounted display 1100 may be replicated across multiple locations in order to distribute the processing load required to function as described herein.

Communication interface 1101 comprises components that communicate over communication links, such as network cards, ports, RF transceivers, processing circuitry and software, or some other communication devices. Communication interface 1101 may be configured to communicate over metallic, wireless, or optical links. Communication interface 1101 may be configured to use TDM, IP, Ethernet, optical networking, wireless protocols, communication signaling, or some other communication format—including combinations thereof.

User interface 1102 comprises components that interact with a user to receive user inputs and to present media and/or information. Specifically, user interface 1102 includes a display for presenting video in the manner described above. User interface 1102 may include a speaker, microphone, buttons, lights, display screen, touch screen, touch pad, scroll wheel, communication port, or some other user input/output apparatus—including combinations thereof.

Sensors 1104 comprise components that capture information relevant to determining the view from or orientation of head mounted display 1100. Sensors 1104 may include a forward facing video camera, 3D gyroscope, accelerometer, eye tracking sensor, or other type of sensor—including combinations thereof.

Processing circuitry 1105 comprises microprocessor and other circuitry that retrieves and executes operating software 1107 from memory device 1106. Memory device 1106 comprises a non-transitory storage medium, such as a disk drive, flash drive, data storage circuitry, or some other memory apparatus. Processing circuitry 1105 is typically mounted on a circuit board that may also hold memory device 1106 and portions of communication interface 1101 and user interface 1102. Operating software 1107 comprises computer programs, firmware, or some other form of machine-readable processing instructions. Operating software 1107 includes information compiling module 1108 and video change module 1109. Operating software 1107 may further include an operating system, utilities, drivers, network interfaces, applications, or some other type of software. When executed by processing circuitry 1105, operating software 1107 directs processing system 1103 to operate head mounted display 1100 as described herein.

In particular, information compiling module 1108 directs processing system 1103 to, during a conference session wherein a plurality of head mounted displays (HMDs) are each worn by one of a plurality of participants, compile first orientation information and first view information from sensors 1104. The orientation information describes current orientation of the first HMD. Based on the first orientation information and the first view information, video change module 1109 directs processing system 1103 to determine a first change to how video is presented by the first HMD and directs the display of user interface 1102 to implement the first change.

Figure 12:
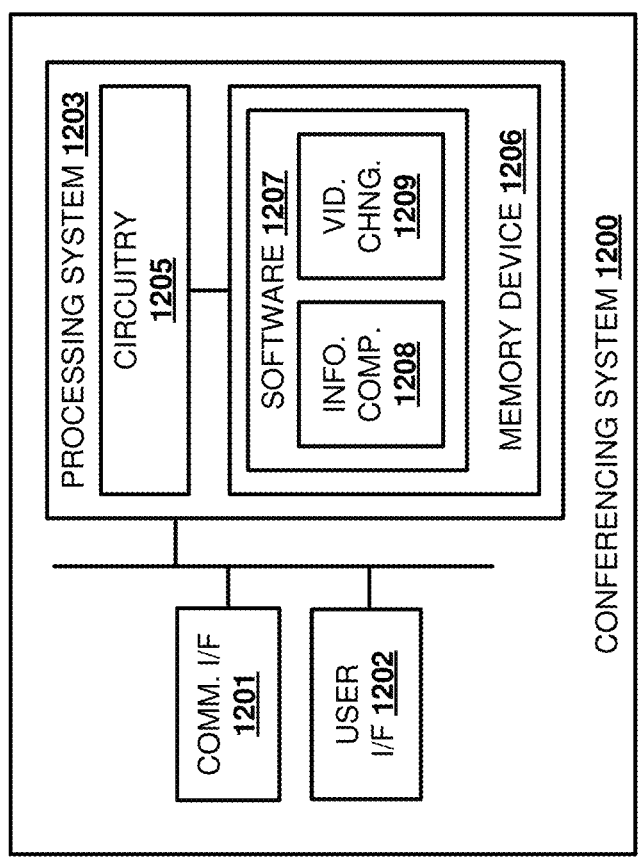
FIG. 12 illustrates a conferencing system for controlling enhanced visual communication between remote participants.

FIG. 12 illustrates conferencing system 1200. Conferencing system 1200 is an example of conferencing server 101, although server 101 could use alternative configurations. Conferencing system 1200 comprises communication interface 1201, user interface 1202, and processing system 1203. Processing system 1203 is linked to communication interface 1201 and user interface 1202. Processing system 1203 includes processing circuitry 1205 and memory device 1206 that stores operating software 1207. Conferencing system 1200 may include other well-known components such as a battery and enclosure that are not shown for clarity. Conferencing system 1200 may be a personal computer, server, or some other computing apparatus—including combinations thereof. In some examples, conferencing system 1200 may be replicated across multiple locations in order to distribute the processing load required to function as described herein.

Communication interface 1201 comprises components that communicate over communication links, such as network cards, ports, RF transceivers, processing circuitry and software, or some other communication devices. Communication interface 1201 may be configured to communicate over metallic, wireless, or optical links. Communication interface 1201 may be configured to use TDM, IP, Ethernet, optical networking, wireless protocols, communication signaling, or some other communication format—including combinations thereof.

User interface 1202 comprises components that interact with a user to receive user inputs and to present media and/or information. User interface 1202 may include a speaker, microphone, buttons, lights, display screen, touch screen, touch pad, scroll wheel, communication port, or some other user input/output apparatus—including combinations thereof. User interface 1202 may be omitted in some examples.

Processing circuitry 1205 comprises microprocessor and other circuitry that retrieves and executes operating software 1207 from memory device 1206. Memory device 1206 comprises a non-transitory storage medium, such as a disk drive, flash drive, data storage circuitry, or some other memory apparatus. Processing circuitry 1205 is typically mounted on a circuit board that may also hold memory device 1206 and portions of communication interface 1201 and user interface 1202. Operating software 1207 comprises computer programs, firmware, or some other form of machine-readable processing instructions. Operating software 1207 includes information compiling module 1208 and video change module 1209. Operating software 1207 may further include an operating system, utilities, drivers, network interfaces, applications, or some other type of software. When executed by processing circuitry 1205, operating software 1207 directs processing system 1203 to operate conferencing system 1200 as described herein.

In particular, information compiling module 1208 directs processing system 1203 to, during a conference session wherein a plurality of head mounted displays (HMDs) are each worn by one of a plurality of participants, compile first orientation information and first view information from a first HMD of the plurality of HMDs via communication interface 1201. The orientation information describes current orientation of the first HMD. Based on the first orientation information and the first view information, video change module 1209 direct processing system 1203 to determine a first change to how video is presented by the first HMD and direct the first HMD to implement the first change over communication interface 1201.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A non-transitory computer readable storage medium having instructions stored thereon that, when executed by a conferencing system, direct the conferencing system to perform a method for controlling a meeting between remote Augmented Reality (AR) and Virtual Reality (VR) participants, the method comprising:

during a conference session wherein a plurality of head mounted displays (HMDs) are each worn by respective ones of a plurality of participants, compiling first orientation information and first view information from a first HMD of the plurality of HMDs, wherein the orientation information describes current orientation of the first HMD and the first HMD comprises an AR HMD with transparent lenses onto which AR information is displayed;
based on the first orientation information and the first view information, determining a first change to how video is presented by the first HMD, wherein determining the first change includes:
using the first view information to determine a first view of a first participant wearing the first HMD, wherein the first view includes what the first participant sees of a physical meeting room through the transparent lenses; and
determining where to place one or more elements, including video captured of one or more remote participants at locations remote to the first HMD, in the video such that, when the video is displayed onto the transparent lenses by the first HMD, the one or more elements appear to the first participant at positions in the meeting room as though the one or more elements are in the physical meeting room with the first participant; and
directing the first HMD to implement the first change.

2. The non-transitory computer readable medium of claim 1, further comprising:
determining the positions in the meeting room.

3. The non-transitory computer readable medium of claim 1, wherein determining the first change further comprises:
identifying a first object of interest in the first view;
determining one or more options for the first object;
receiving first input from the first participant selecting a first option of the one or more options; and
based on the first option and the first object, generating the one or more elements.

4. The non-transitory computer readable medium of claim 3, wherein the first object comprises a document and wherein the one or more elements comprises a video representation of the document.

5. The non-transitory computer readable medium of claim 3, wherein the first input includes an instruction to present the one or more elements in video presented by each other HMD of the plurality of HMDs other than the first HMD, and the method further comprising:
directing the other HMDs to present video of the one or more elements.

6. The non-transitory computer readable medium of claim 3, wherein the first input comprises a head nod identified from second orientation information.

7. The non-transitory computer readable medium of claim 3, wherein the first input comprises a hand gesture made by the first participant.

8. The non-transitory computer readable medium of claim 3, wherein the first input comprises input by the first participant into a peripheral device.

9. The non-transitory computer readable medium of claim 1, wherein the first orientation information indicates that a first participant wearing the first HMD is leaning forward and wherein determining the first change comprises:
determining a zoom level for the video corresponding to an amount in which the first participant is leaning forward.

10. A conferencing system for controlling a meeting between remote Augmented Reality (AR) and Virtual Reality (VR) participants, the conferencing system comprising:
a communication interface configured to, during a conference session wherein a plurality of head mounted displays (HMDs) are each worn by respective ones of a plurality of participants, compile first orientation information and first view information from a first HMD of the plurality of HMDs, wherein the orientation information describes current orientation of the first HMD and the first HMD comprises an AR HMD with transparent lenses onto which AR information is displayed;
a processing system configured to, based on the first orientation information and the first view information, determine a first change to how video is presented by the first HMD by:
using the first view information to determine a first view of a first participant wearing the first HMD, wherein the first view includes what the first participant sees of a physical meeting room through the transparent lenses; and
determining where to place one or more elements, including video captured of one or more remote participants at locations remote to the first HMD, in the video such that, when the video is displayed onto the transparent lenses by the first HMD, the one or more elements appear to the first participant at positions in the meeting room as though the one or more elements are in the physical meeting room with the first participant; and
direct the first HMD to implement the first change.

11. The conferencing system of claim 10, wherein the processing system is further configured to determine the positions in the meeting room of the first HMD for each of the one or more remote participants from the perspective of the first view.

12. The conferencing system of claim 10, wherein the processing system configured to determine the first change further comprises the processing system configured to:
identify a first object of interest in the first view;
determine one or more options for the first object;
receive first input from the first participant selecting a first option of the one or more options; and
based on the first option and the first object, generate the one or more elements.

13. The conferencing system of claim 12, wherein the first object comprises a document and wherein the one or more elements comprises a video representation of the document.

14. The conferencing system of claim 12, wherein the first input includes an instruction to present the one or more elements in video presented by each other HMD of the plurality of HMDs other than the first HMD, further comprising:
the processing system configured to direct the other HMDs to present video of the one or more elements.

15. The conferencing system of claim 12, wherein the first input comprises a head nod identified from second orientation information.

16. The conferencing system of claim 12, wherein the first input comprises a hand gesture made by the first participant.

17. The conferencing system of claim 12, wherein the first input comprises input by the first participant into a peripheral device.

18. The conferencing system of claim 10, wherein the first orientation information indicates that a first participant wearing the first HMD is leaning forward and wherein the processing system configured to determine the first change comprises:
the processing system configured to determine a zoom level for the video corresponding to an amount in which the first participant is leaning forward.

* * * * *